United States Patent [19]
Evans

[11] Patent Number: 5,600,479
[45] Date of Patent: Feb. 4, 1997

[54] METHOD AND APPARATUS FOR OPTICAL LOGIC AND SWITCHING FUNCTIONS

[75] Inventor: Alan F. Evans, Beaver Dams, N.Y.

[73] Assignee: Corning Incorporated, Corning, N.Y.

[21] Appl. No.: 577,136

[22] Filed: Dec. 22, 1995

[51] Int. Cl.$^6$ .............................. G02B 26/00; G02B 6/26; G02F 3/00
[52] U.S. Cl. .................... 359/237; 359/108; 359/124; 341/137; 385/16
[58] Field of Search .................. 359/107, 108, 359/124, 117, 334, 237; 341/137; 385/15, 16

[56] References Cited

U.S. PATENT DOCUMENTS

| | | | |
|---|---|---|---|
| 4,616,898 | 10/1986 | Hicks, Jr. | 350/96.15 |
| 4,690,489 | 9/1987 | Neyer | 350/96.14 |
| 4,740,974 | 4/1988 | Byron | 372/3 |
| 4,881,788 | 11/1989 | Doran | 350/96.15 |
| 4,932,739 | 6/1990 | Islam | 350/96.15 |
| 5,020,050 | 5/1991 | Islam | 359/108 |
| 5,170,273 | 12/1992 | Nishio | 359/128 |
| 5,189,542 | 2/1993 | Oudar | 359/128 |
| 5,224,194 | 6/1993 | Islam | 385/122 |

OTHER PUBLICATIONS

Electronics Letter, 9th May 1991; vol. 27 No. 10 *Optical Intensity Dependent Switching Using Soliton Self-Frequency Shift.*

Primary Examiner—Mark Hellner
Attorney, Agent, or Firm—Harris Beach & Wilcox, LLP

[57] ABSTRACT

Intrapulse Raman scattering is utilized in providing optical devices that can be adapted to perform various logic and switching functions. In a logic gate embodiment of the present invention, a plurality of pulses of the same central wavelength are coupled to produce an output pulse having a power level equal to the sum power level of the inputs. When the power level of a sufficiently narrow output pulse exceeds the Raman threshold, the output pulse experiences a wavelength shift of a magnitude that can be controlled by adjusting the input power. An optical filter selectively blocks coupler output pulses depending on the desired logical operation of the device. In a switch according to the invention, an input pulse and a control pulse are coupled, and Raman scattering of the output pulse is stimulated. The output pulse is applied to several output lines, each having a filter centered at a predetermined pass band. The input pulse is thereby passed to a selected output line or lines depending on the magnitude of the control pulse.

21 Claims, 5 Drawing Sheets

METHOD AND APPARATUS FOR OPTICAL LOGIC AND SWITCHING FUNCTIONS

BACKGROUND OF THE INVENTION

1. Field of the Invention

The present invention relates to optical devices in general and in particular to an improved method and apparatus for performing optical logic and switching functions.

2. Description of Background

Optical logic and switching devices commonly include semiconductor components which are electrically biased to achieve proper processing of optical signals impinging on the semiconductor components. These electrooptical devices exhibit various disadvantages. Most significantly, electrooptical logic and switching devices have speed limitations associated with the RC time constant of the electrodes, and in addition experience energy losses as a result of the electrical to optical conversion process.

Recently, proposals have been made for the design of "all-optical" logic gates and switches. For example, U.S. Pat. No. 4,881,788 to Doran discloses an optical device wherein coupled signals are split and propagated along first and second optical fibers having equal lengths but different material properties. Signals propagating through the fibers arrive synchronously but phase shifted at a coupler connected at the terminal end of the fibers, and logic or switching operations are realized by detection of the phase shift. In a device described in U.S. Pat. No. 4,932,739 to Islam, a pair of optical signals are propagated in a birinfringent fiber to induce soliton trapping between the signals, and logical operations are realized by detection of effects resulting from the trapping. The above designs suffer from numerous limitations including high switching power, environmental instability, and long latency time.

There exists a need for a method and apparatus for providing all optical logic and switching functions which does not exhibit the disadvantages inherent in the prior art devices.

SUMMARY OF THE INVENTION

According to its major aspects and broadly stated, the present invention is an optical device which utilizes intrapulse Raman scattering to provide a logic operation or switching function.

When Raman scattering is stimulated in an optical fiber, a small fraction of the incident power from an optical beam is converted into another optical beam at a frequency downshifted by an amount determined by the vibrational modes of the medium. Intrapulse Raman scattering, also known as soliton self-frequency shift, occurs within a single optical pulse whose optical spectrum is sufficiently broad for the lower wavelength components within the pulse to transfer energy to the high wavelength components. There is a continual downshift in frequency (red shift in wavelength) as the pulse propagates along the fiber. Given the inverse relation between the pulse's temporal width and its optical spectrum and also the shape of the Raman gain spectrum, the intrapulse Raman effect is extremely sensitive to temporal width. In fact, solitons (optical pulses with a hyperbolic pulse shape and the correct peak power to pulse relation) propagating in silica fibers will be downshifted in frequency by an amount that depends on the fourth power of the pulse width. Because soliton pulse width compression can be generated by adjusting the order number of the soliton (which varies depending on input power), the wavelength shift of a soliton pulse propagating in a fiber can be adjusted by adjusting the input power of the pulse. For Raman scattering of soliton propagation in an optical fiber to build up exponentially, the input power must be above the Raman threshold, a quantity determined by the Raman gain, the effective core area of the fiber, and the effective length of the fiber.

In a logic gate embodiment of the present invention, a plurality of pulses of the same central wavelength are coupled to produce an output pulse having a power level equal to the sum power level of the inputs. When the power level of a sufficiently narrow output pulse exceeds the Raman threshold, the output will experience a wavelength shift. Provided the soliton order number of the pulse is maintained at a level close to $N=1$, the magnitude of the wavelength shift increases with increasing input power.

By convention, a logic "0" in a return-to-zero (RZ) optical network is provided by the absence of a soliton, and a logic "1" is provided by the presence of a soliton. In a two-input AND logic gate of the present invention, a logic "1" is provided by a soliton having a power level of between about 0.5 and about 1.0 times the Raman threshold power level. Therefore, when one or no logic "1" pulses are input into a two input AND gate coupler, the output power level will be lower than the Raman threshold power level, and the wavelength of the output pulse will not be shifted. When two logic "1" input pulses are input into the AND gate coupler, the output power will be greater than the Raman threshold, and the output pulse will be shifted in wavelength.

A logic gate according to the invention further includes a filter which passes or blocks coupler output pulses depending on the wavelength of the output pulse. In a two input AND gate, the filter is selected to block output pulses having unshifted wavelengths, and pass pulses having shifted wavelengths. Therefore, the filter will pass an output pulse only when two logic "1" inputs are coupled to produce an output having a shifted wavelength.

In an optical switch embodiment of the invention, an optical pulse is made to switch to one or more output lines of a plurality of output lines depending upon the magnitude of a control pulse. An input pulse and a control pulse are input into an optical coupler which combines the pulses to produce an output representing the combined power levels of the input pulse and the control pulse. As in the logic gate embodiment, the output of the coupler will be shifted as a result of the Raman effect when the coupler output power level exceeds the Raman threshold for the output fiber. The magnitude of the wavelength shift increases with increasing power level provided the soliton order number of the coupler output is maintained at a level close to $N=1$.

In a typical embodiment of the switch, the input signal is made to have a power level approximately equal to the Raman threshold, and close to the fundamental soliton order number $N=1$, preferably in the range of about $N=0.5$ and $N=2$. Thus, a control pulse having a power level of approximately zero will produce essentially no wavelength shift, while control pulses having power levels of above zero will produce wavelength shifts that increase in magnitude with increasing control pulse power level.

A splitter is connected at the coupler output that presents the coupler output to each of several output lines. In turn, a wavelength-selective filter disposed at each output line passes or blocks the coupler output depending on the magnitude of the wavelength shift. Typically, each wavelength-selective filter will pass pulses representing wavelength shifts within a specific range and will block pulses having shifts outside of the specific range. Thus, the output line or lines on which to transmit the coupler output can be selected by adjusting the power level of the control pulse in accordance with the characteristics of the filter associated with the desired output line.

In either a logic gate or a switch, the coupler output power level (which represents combined power level of input pulses in the case of a logic gate, and combined power level of an input pulse and a control pulse in the case of a switch) should be maintained in a range of values close to the fundamental soliton order number (N=1) to prevent excessive pulse reshaping or higher order pulse breakup. Maintaining the order number of the coupler output at a level close to N=1 provides a controllable, easily detected, power-dependent, wavelength shift.

Higher order solitons (N≧2) experience pronounced temporal and spectral fluctuations, including spectral broadening and narrowing. Additionally, the presence of Raman scattering asymmetries the gain and loss the solitons experience. As a result, higher order solitons can break apart into their component pulses (e.g. N=3 solitons break into three spectral pulses whose amplitudes can be determined by what is known by inverse scattering method). Spectral broadening of a soliton during propagation can cause a wavelength-selective filter to pass a pulse which would have been blocked by a filter if not for the spectral broadening. For limiting spectral oscillations and pulse breakup, the soliton order number of a gate or switch coupler output is preferably maintained between N=0.5 and about N=2.

Significant intrapulse Raman scattering occurs where the width of a pulse is on the order of about 1 ps or less and where the power level of the pulse is above the Raman threshold. Designers of optical circuitry normally try to guard against stimulating Raman scattering in their circuits so as to avoid unwanted energy transfers. Prevention of intrapulse Raman scattering in an optical circuit is normally ensured by providing a standard network soliton pulse width of much greater than 1 ps.

Because they will find use in optical networks wherein the width of a standard pulse is more than 1 ps, devices of the present invention will normally require additional optical components for narrowing the width of an input pulse so that significant intrapulse Raman scattering can take effect, and for broadening the width of an output pulse so that the output pulse is of a width equal to a network's standard pulse width.

Pulse narrowing can be accomplished by a number of different methods, including by chirped, photorefractive, fiber Bragg gratings and dispersion-tailored fiber. Both of these methods occur entirely in a length of fiber which is preferable. Fiber gratings are more compact (lengths of about 1–10 mm) but are reflective at the central design wavelength and therefore require additional components to extract the compressed pulse. Dispersion-decreasing fiber can adiabatically compress the soliton while maintaining its transform limited pulse shape. Conversely, dispersion-increasing fiber can adiabatically expand the soliton while maintaining its transform-limited shape. Chirped fiber gratings can also stretch pulses by launching the light in the opposite direction (in reverse).

A major feature of the logic gate of the present invention is the combination of conditional intrapulse Raman scattering with a wavelength selective filter which detects if Raman scattering has been stimulated. The combination of these major elements provides an all-optical logic gate made entirely of passive components.

A major feature of the switch according to the invention is the combination of controlled Intrapulse Raman scattering with an array of wavelength selective filters responsive to the magnitude of Raman scattering stimulated by the control input. The combination of these two major elements provides an all-optical switch made entirely of passive components.

A feature common to both the logic gate and switch of the invention is the maintaining of a coupler output power level at a soliton order number close to N=1. Maintaining the coupler output power level close to the fundamental soliton order number N=1 provides accurate and reliable wavelength selection in the filtering stage of each embodiment.

Another feature common to both embodiments is the pulse narrowing optical component included at an input of a logic gate or switch. Including a pulse narrowing optical component which narrows a pulse width to a width on the order of 1 ps enables Raman scattering to take effect in a logic gate or switch.

Yet another feature common to both embodiments is the inclusion of a pulse broadening optical component at the output of a logic gate or switch. Inclusion of a pulse broadening optical component provides broadening of an output pulse so that the pulse has a width equivalent to that of a standard network pulse.

These and other features and advantages of the present invention will become apparent to persons skilled in the art upon a reading of the ensuing Detailed Description of the Invention in connection with the referenced drawings.

DETAILED DESCRIPTION OF THE PREFERRED EMBODIMENTS

When Raman scattering is stimulated in an optical fiber, a small fraction of the incident power from an optical beam is converted into another optical beam at a frequency downshifted by an amount determined by the vibrational modes of the medium. Interpulse Raman scattering (not utilized in the present invention) is detrimental in communication systems with multi-wavelength optical channels. The lower wavelength channels lose energy to the higher wavelength channels thereby creating cross talk.

Figure 5:
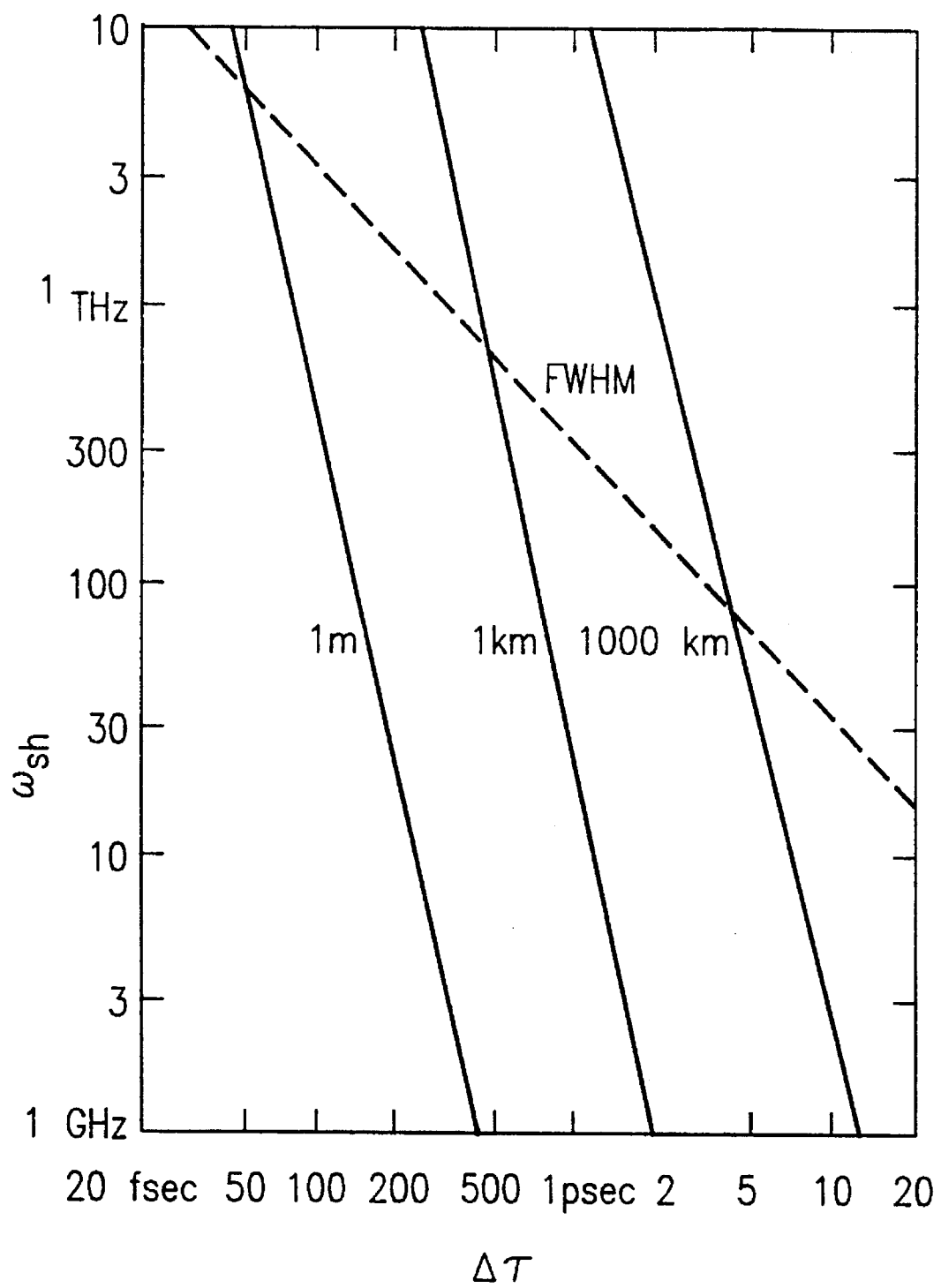
FIG. 5 is a graph illustrating dependency of Raman effect induced frequency shift on input pulse width.

Intrapulse Raman scattering, also known as soliton self-frequency shift, occurs within a single optical pulse whose optical spectrum is sufficiently broad for the lower wavelength components within the pulse to transfer energy to the high wavelength components. There is a continual downshift in frequency (red shift in wavelength) as the pulse propagates along the fiber. Given the inverse relation between the pulse's temporal width and its optical spectrum and also the shape of the Raman gain spectrum, the Intrapulse Raman effect is extremely sensitive to temporal width. Solitons (optical pulses with a hyperbolic pulse shape and the correct peak power to pulse relation propagating in silica fibers will be downshifted in frequency by an amount that depends on the fourth power of the pulse width. Solitons propagating in silica fibers that undergo Raman scattering experience a frequency shift of a magnitude that varies approximately according to:

$$\omega_{SH} = \frac{0.0436}{\Delta\tau^4} L \qquad \text{Equation 1}$$

where L length of the fiber, and $\Delta\tau$ is the pulse width of an input pulse and dispersion is equal to 15 ps/nm/km. This result is presented graphically in FIG. 5 which plots pulse width $\Delta\tau$ against optical frequency shift $\omega_{SH}$ for three differently-lengthened fibers. It is seen from FIG. 5 that significant wavelength shifting (1 nm or more) is stimulated in pulses having widths on the order of about 1 ps or less that propagate in ~1 km silica fibers.

Figure 6:
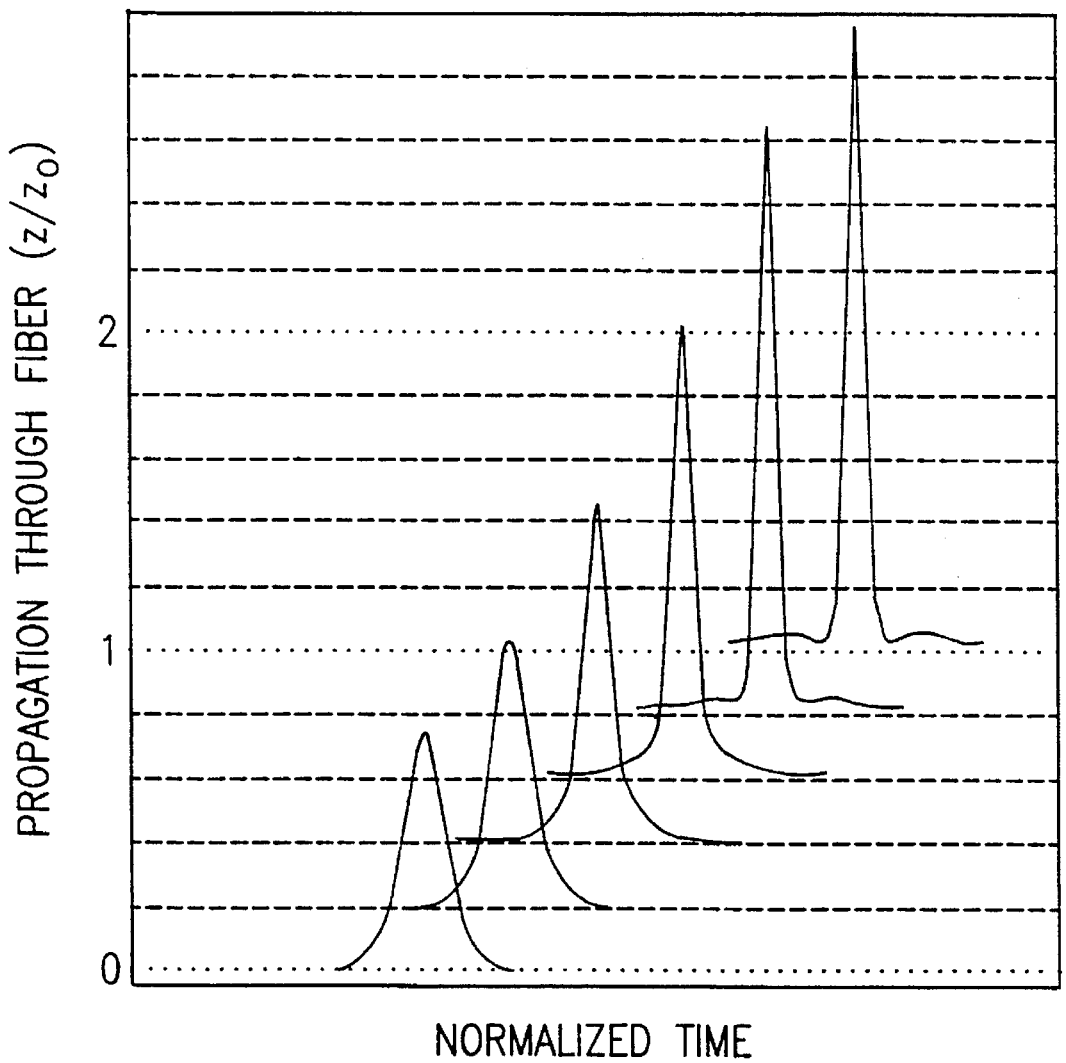
FIG. 6 is a diagram illustrating temporal width compression of an N=1.5 soliton propagating along a length of fiber.
Figure 7:
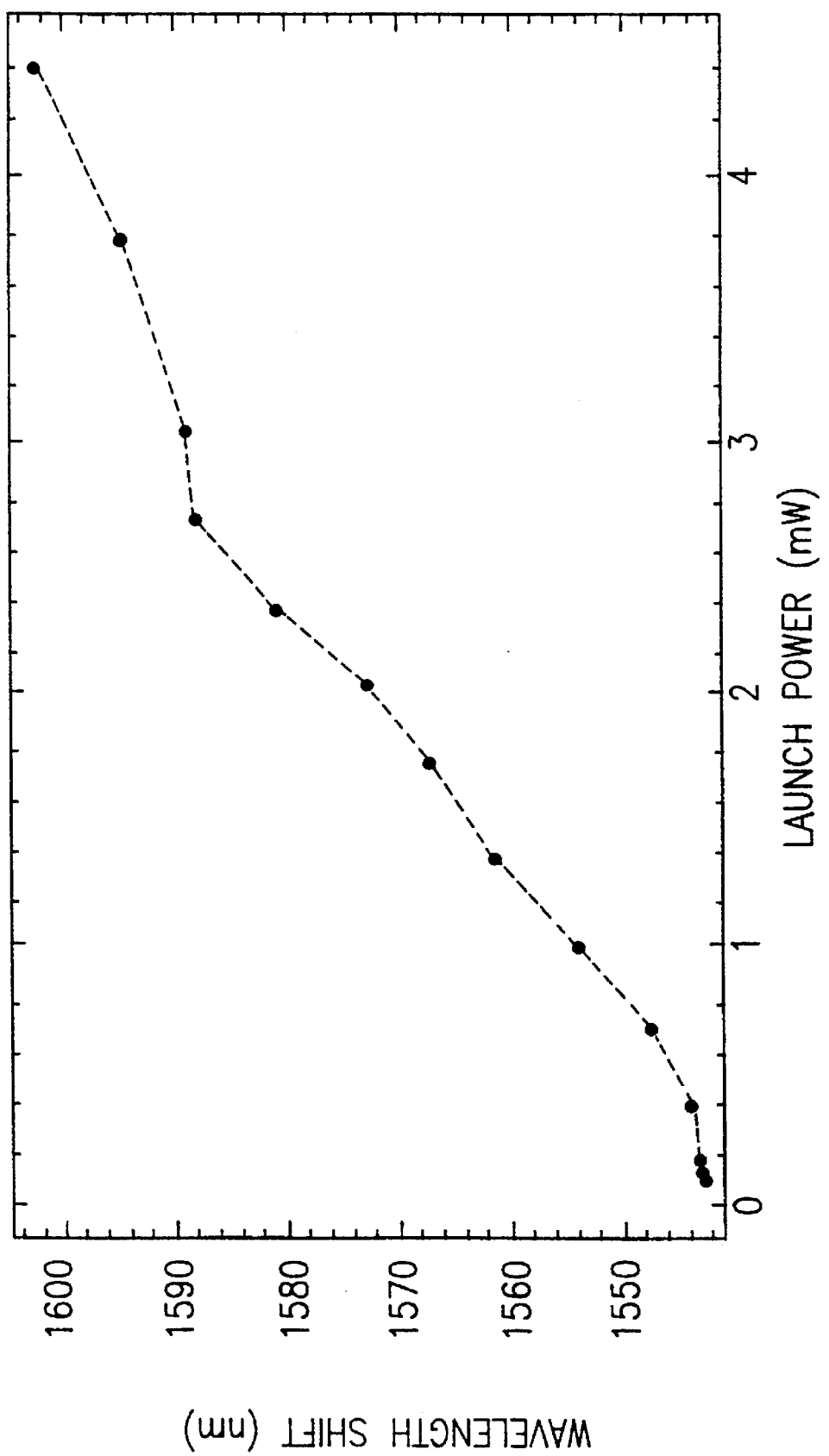
FIG. 7 is a plot containing experimental data illustrating dependence of wavelength shift for a short width pulse on pulse input power.

Wavelength shifting resulting from the Raman effect can also be related to pulse input power. Solitons having order numbers greater than N=1 experience initial pulse compression (temporal narrowing) as they propagate in a length of fiber at a rate that increases with increasing input power level. Solitons having order numbers of less than N=1, meanwhile, experience pulse broadening during propagation at a rate that increases with decreasing power level. Generally therefore, the width of a propagation pulse at a given point in a length of fiber can be narrowed by increasing the input power level. The amount of compression depends upon the initial peak power. A diagram illustrating temporal pulse compression of an N=1.5 soliton propagating along a length of fiber is presented as FIG. 6. Because Raman effect wavelength shifting is pulse width sensitive, the amount of wavelength shifting increases with increasing input pulse power. An expression for the soliton compression factor as a function of soliton order number is given by:

$$\frac{\Delta\tau_{in}}{\Delta\tau_{out}} = 4.1N \qquad \text{Equation 2}$$

for an optimum fiber length, $Z_{OPT}$, determined by $$\frac{Z_{OPT}}{Z_o} = \frac{0.32}{N} + \frac{1.1}{N^2} \qquad \text{Equation 2b}$$

where $\Delta\tau_{in}$ is the input pulse width, $\Delta\tau_{out}$ is the output pulse width, N is the soliton order number, and $Z_o$ is the soliton period. FIG. 7 illustrates experimental results of the wavelength v. input power this dependence for a ~1 ps pulse propagating through 40 km of dispersion decreasing fiber.

The present invention utilizes this controllable Raman wavelength shift (which can be made to vary depending on the input power level) in providing a logic gate or switch. A detailed discussion of intrapulse Raman scattering and of pulse width dependant wavelength shifting appears in "Theory of the soliton self-frequency shift," J. P. Gordon, Optics Letters, Vol. 11, No. 10, pp. 662–664. A detailed treatment of various nonlinear effects encountered during soliton pulse propagation appears in *Nonlinear Fiber Optics,* by Govind P. Agrawal, Academic Press (1995). For a detailed discussion of the phenomena of higher order soliton pulse compression, see Agrawal, at section 6.4.

Figure 1:
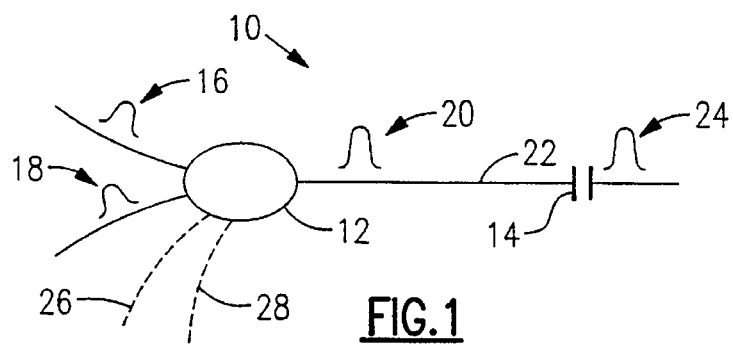
FIG. 1 shows an embodiment of a logic gate according to the invention.

A logic gate according to the invention is shown in FIG. 1. Logic gate 10 includes fiber coupler 12 and a wavelength selective filter 14. Coupler 12 receives two or more input pulses, represented as 16 and 18 having predetermined power levels, and combines these pulses to produce an output pulse 20 having a magnitude approximately equal to the sum of the input pulses. Wavelength selective filter 14 selectively passes or blocks optical signals depending on the wavelength of the propagating signal.

In general, a coupler output pulse propagating though coupler output fiber 22 undergoes Stimulated Raman Scattering if the pulse has a sufficiently narrow pulse width and if the pulse has a power level above the Raman threshold. If Raman scattering of pulse 20 is stimulated, pulse 20 will experience a wavelength shift. Therefore, whether or not wavelength selective filter 14 passes a coupler output pulse 20 depends indirectly on the power level of the coupled output. Because filter 12 passes pulses depending indirectly on the power level of the coupler output, the filter output indicates information pertaining to the coupler input pattern of input pulses into coupler 16 and 18, which have predetermined power levels, and which determine the coupler output power level. Various logical operations of the device can be performed by coordinating the following: the power level of the inputs into coupler 16 and 18; the number of inputs into 16 and 18; the Raman threshold of the coupler output fiber; the output fiber length, 22; and the pass band of filter 14.

By convention, a logic "0" is provided by the absence of a soliton, and a logic "1" is provided by the presence of a soliton. In the present invention, filter 14 will block a coupler output pulse if the input pattern is desired to result in a "0" logical output, and will pass a coupler output pulse if the input pattern is desired to result in a "1" logical output. Logical operations that can be performed using a logic gate according to the present invention are best described by way of example.

In a two input AND logic gate, the power levels of the inputs 16 and 18, the Raman threshold of coupler output fiber 22, and the pass band of the wavelength selective filter 14 are coordinated so that a soliton pulse will be passed as a "1" Logic filter output only if a pair of soliton pulses (a pair of "1") inputs are presented to coupler 12.

A two-input AND logic gate can be provided by coordinating the power level of the coupler inputs 16 and 18 and the Raman threshold of coupler output 20 so that Raman scattering of coupler output 20 is stimulated only if the coupler output has a power level corresponding to an input pattern wherein both inputs are "1". Such selective stimulation of Raman scattering is provided by selecting for the coupler inputs a "1" input power level of between about 0.5 and about 1.0 times the Raman threshold for the coupler output propagating on coupler output fiber 22.

In an AND gate, filter 14 generates a "1" logical output by passing pulses having shifted wavelengths, and blocking pulses having center wavelengths equal to the input wavelength. An AND logic operation could also be accomplished by providing aa input power level above the Raman threshold so that Raman shifting occurs under a 0 1, 1 0 input pattern as well as under a 1 1 input pattern, and a filter that passes a coupler output only if the coupler output has a shifted wavelength of the larger magnitude corresponding to the 1 1 input pattern.

An AND gate according to the invention can easily be scaled up for additional inputs, as indicated by dashed inputs 26 and 28 of FIG. 1. An input AND gate can be provided by selecting an input power level of at least 1/m times the Raman threshold, where M is the number of inputs so that an input pattern having all "1" inputs results in a shifted wavelength which can be detected by filter 14.

In an EXOR logic gate according to the invention, input power level is selected to be above the Raman threshold so that 0 1 and 1 0 input patterns stimulate a coupler output having a first wavelength shift magnitude and a 1 1 input pattern stimulates a coupler output having a second wavelength shift magnitude higher than the first. Selecting filter 14 to have a narrow pass band which passes pulses having wavelengths corresponding to 0 1 and 1 0 input patterns but which blocks pulses having wavelengths corresponding to a 1 1 input pattern provides an EXOR logical operation.

Taking advantage of the fact that a pair of coupled "0" input pulses will always generate a "0" logical output at the output of filter 14, a simplified embodiment of an EXOR logic gate can be made by providing a pulse input power of between about 0.5 and about 1.0 times the Raman threshold for output fiber 22, and by selecting filter 14 so that filter 14 blocks pulses having shifted wavelengths, and passes pulses having unshifted wavelengths.

Figure 2:
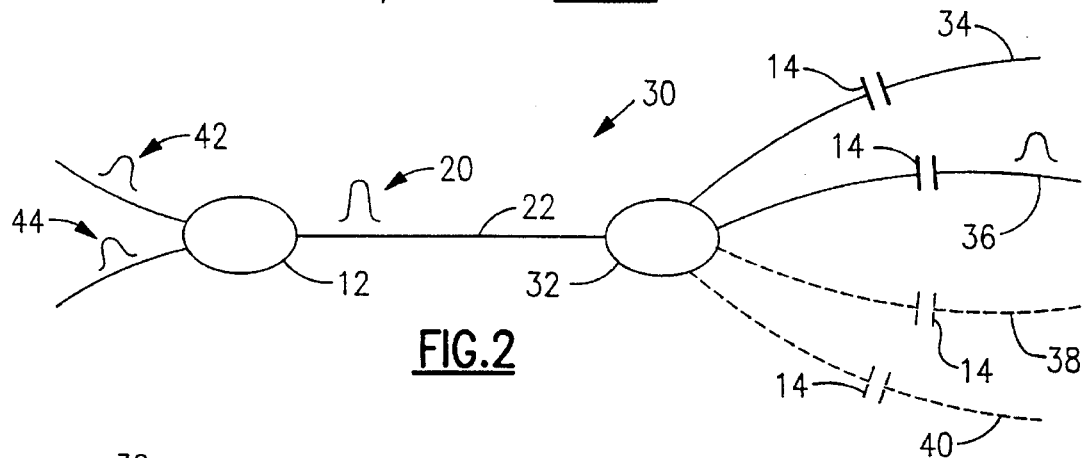
FIG. 2 shows an embodiment of a switch according to the invention.

Now referring to FIG. 2 operation of a switch according the invention will be described. Switch 30 includes a coupler 12, a splitter 32 and a plurality of output lines, for example, 34, 36, 38 and 40 each having a wavelength-selective filter 14 associated therewith, for selectively passing coupler output pulses depending on the wavelength of the pulse. Coupler 12 receives an input pulse having a predetermined power level, represented as 42, and a control pulse 44, and combines these pulses to generate a coupler output pulse 20 having a power level approximately equal to the sum of the input pulse power level and the power level of the control pulse.

Where the coupler output pulse 20 is of a sufficiently narrow width, and has a power level exceeding the Raman threshold for a pulse propagating in coupler output fiber 22, coupler output pulse 20 will be shifted in wavelength. The amount of wavelength shifting increases with increasing coupler output power level, for solitons having order numbers close to N=1. In a typical switch, each output line filter 34, 36, 38, 40 will have a different pass band (though a switch can be made wherein more than one filter can have the same pass band). Therefore, by controlling the amount of wavelength-shift experienced by coupler output 20, control pulse 44 controls through which filter, and therefore, to which output line (or lines) a coupler output pulse is passed.

In one preferred embodiment, a switch according to the invention is made by selecting a power level for input pulse 42 at about the Raman threshold for output fiber 22. If input pulse 42 is selected to have a power level at about the Raman threshold, and at a solition order number close to N=1 then a zero power level control pulse will generate a coupler output pulse having a non-shifted wavelength, and for each control pulse having a power level above zero, the control pulse will generate a wavelength shift that increases with increasing control pulse power. Following this scheme, one filter 34 can be selected to have a pass band corresponding to the input wavelength, and each successive filter 36 and 38 can be selected to have pass bands of incrementally increasing wavelengths, each corresponding to a wavelength-shift resulting from an increment in the power level of control pulse Thusfar, basic operating principles of logic gates and switches according to the invention have been described. Now the discussion will be expanded to include more specific design requirements of gates and switches according to the invention.

The Raman threshold, $P_{TH}$ for an optical signal propagating in a given length of fiber is given by $$P_{TH} \approx \frac{16 A_{eff}}{g_R L_{eff}} \qquad \text{Equation 3}$$

where $A_{eff}$ is the effective core area of the fiber, $L_{eff}$ is the effective length of the fiber, and $g_R$ is the Raman gain coefficient. It is seen therefore that the Raman threshold can be lowered by decreasing the effective core area of the fiber, increasing the effective length of the fiber, or by increasing the fiber's Raman gain coefficient.

In a soliton optical network, it is desirable to adjust the soliton power level to form average or guiding center solitons throughout the fiber links that do not stimulate Raman scattering. By contrast, in devices of the present invention, material properties of coupler output fiber 22 are controlled to selectively stimulate Raman scattering of coupler output pulse 20. Depending on the application, the Raman threshold for a coupler output fiber will be adjusted to a power level of between N=1 and N=M times the input pulse power level where M is the number of input ports. Hence, it will be necessary in the present invention to adjust the effective area and effective length of coupler output fiber 22 such that the Raman threshold is at the desired power level within this range.

Figure 8:
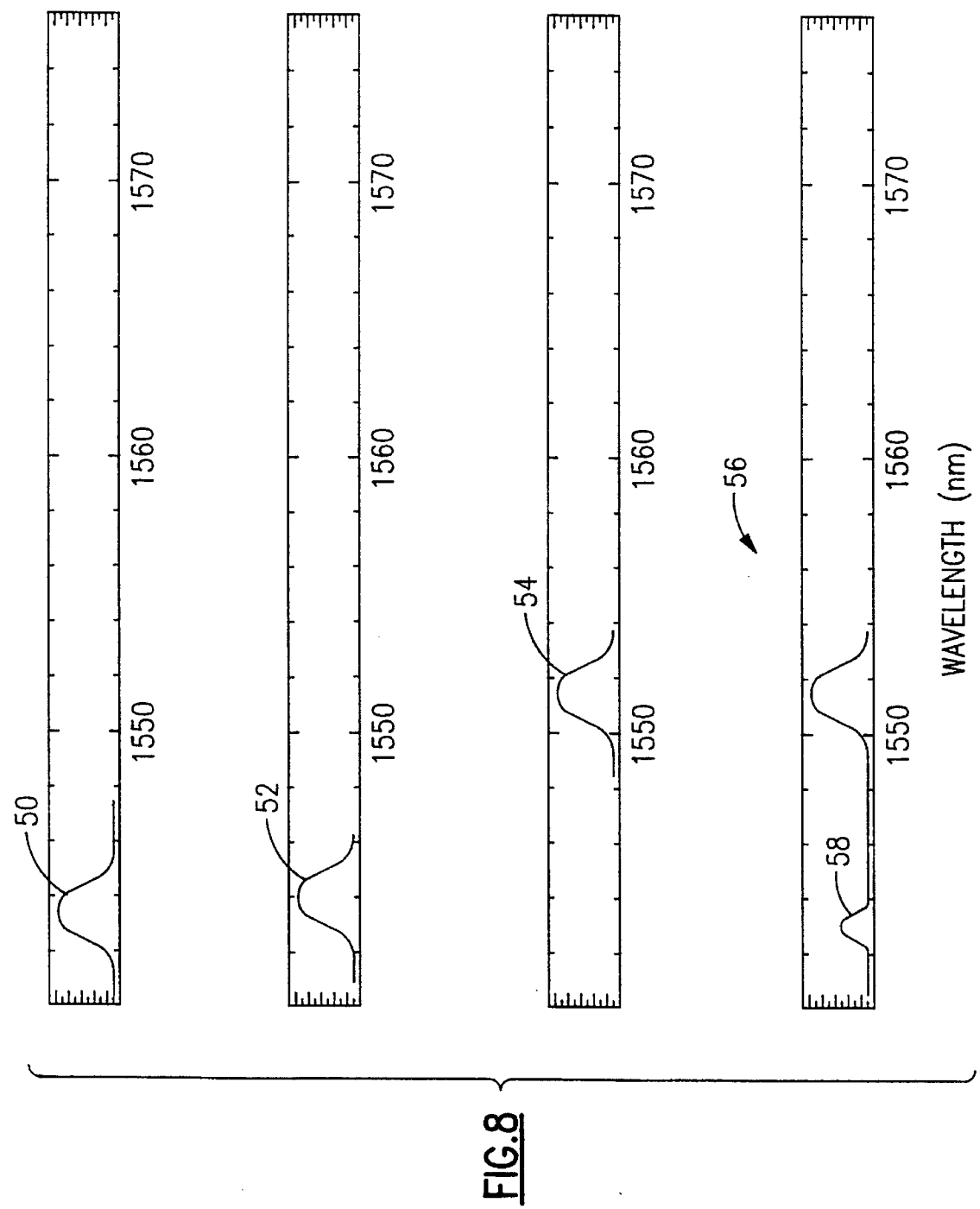
FIG. 8 is a chart helpful in understanding the invention showing an input spectrum as compared to several possible coupler output spectrums.

The input power level and Raman threshold must be coordinated so that a filter-detectable wavelength shift is generated when the coupler output exceeds the threshold. A filter-detectable wavelength shift is yielded, for example, where the spectral profile of a coupler output pulse does not interfere with (or overlap) the spectral profile of the input pulse. To illustrate with reference to FIG. 8 a spectral profile for a representative ~1 ps, ~1 W input pulse is indicated as spectrum 50. Output spectrum 52 has an undetectable wavelength shift with respect to input pulse 50 as the spectrum overlaps that of the input, while output spectrum 54 clearly can be distinguished from spectrum 50 by a wavelength selective filter.

In the case of a logic gate, the input power level, the Raman threshold, and the operating wavelength of wavelength-selective filter 14 do not have to be precisely controlled since it is normally required that only one, and sometimes two discreet wavelength shifts are generated under the possible input conditions. However, in the case of a switch having a plurality of output lines, a discreet filter-detectable wavelength shift is required for each output line 34, 36, 38, 40.

Providing a plurality of filter-detectable wavelength shifts requires control of the shift of the center wavelength, given by Eq. 1, and of the spectral width of the output spectrum, $\Delta\gamma_{out}$, which can be approximated by $$\Delta\gamma_{out} = \frac{0.315}{\Delta\tau} \qquad \text{Equation 4}$$

for a transform-limited soliton pulse where $\Delta\tau$ is the pulse temporal full-width half-maximum. It is seen therefore, that temporary re-broadening the pulse will narrow the spectrum, allowing for improved detectability of wavelength shifts produced at the coupler output.

Aside from input pulse width, another factor influencing the detectability of the wavelength shift is the coupler output power level. Preferably, coupler output power level is controlled so that generation of higher order (N≧2) solitons, and of lower order (N<<1) solitons is avoided.

A soliton pulse having a power level at the fundamental soliton power level N=1 will maintain a consistent temporal and spectral profile as it propagates along a length of fiber. Solitons experience increasingly pronounced temporal and spectral fluctuations, including spectral narrowing and broadening, as the difference between 1 and the soliton number, N, increases. For a more detailed discussion of lower order and higher order solitons, see Agrawal, at section 5.

Spectral broadening of a soliton during propagation can cause a wavelength-selective filter to pass a pulse which would have been blocked by the filter if not for the spectral broadening. It is seen that spectrum 56 illustrated in FIG. 8 typical of a higher order N=2.5 would be erroneously passed by a filter designed to block pulses at the input frequency since spectrum 56 is extremely broad and contains an additional spectral peak 58 at the input wavelength. For limiting spectral broadening owing to the generation of higher and lower order solitons, the power level of coupler output 20 should be maintained at a level corresponding to a soliton number of between about N=0.5 and about N=2.

While solitons having soliton order numbers of between N=0.5 and N=2 will also experience spectral broadening or narrowing, the filters, 14, can either be designed to avoid cross-talk between the various output states or the output pulses can be re-expanded to provide re-narrowing of the output spectrum.

The soliton order number, N, of a soliton as a function of pulse power is given by $$N = \sqrt{\frac{P_o K Z_o N_2}{A_{\it eff}}} \quad \text{Equation 5}$$

where $P_o$ is the peak power, K is a proportionality constant, $Z_o$ is the soliton period, $N_2$ is the nonlinear Kerr coefficient, and $A_{\it eff}$ is the effective core area of the fiber.

In the present invention, the coupler output must feature a range of power levels sufficient to generate a range of filter-detectable wavelength shifts. At the same time, as seen from the above, the range of power levels should be limited so that generation of lower and higher order solitons is avoided.

While it is preferred for improved control and performance to maintain the soliton order number at between about N=0.5 and about N=2, it will be recognized that coupler output pulses having soliton order numbers outside of this range can be utilized in embodiments of the invention if such utilization does not interfere with the functioning of a wavelength-selective filter 14. For example, output spectral profile 56 of FIG. 8 having an additional spectral peak 58 at the input wavelength can be utilized in gates and switches according to the invention as long as such gates and switches do not require a filter having a pass band at the input wavelength.

Figure 3:
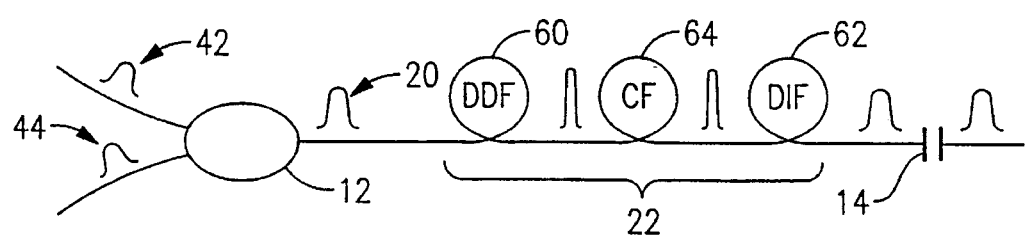
FIG. 3 shows an alternative embodiment of a logic gate according to the invention.
Figure 4:
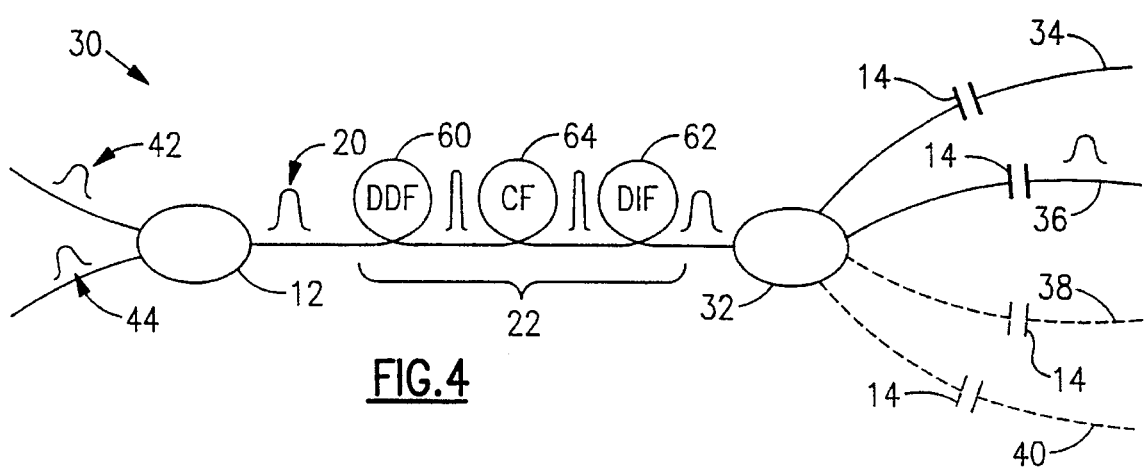
FIG. 4 shows an alternative embodiment of a switch according to the invention.

FIGS. 3 and 4 show alternative embodiments of a gate and switch, respectively, having additional components for providing improved performance.

Significant intrapulse Raman scattering occurs where the width of a pulse is on the order of about 1 ps or less and where the power level of the pulse is above the Raman threshold. Designers of optical circuitry normally try to guard against stimulating Raman scattering in their circuits so as to avoid unwanted energy transfers. Intrapulse Raman scattering causes cross-talk between channels in a multiwavelength optical system. Neither effect is as limiting as other fiber nonlinearities in present optical communication systems.

In a gate or switch according the present invention a dispersion decreasing fiber (DDF) 60 can be implemented (most conveniently as part of output fiber 22) for narrowing of pulses from a network pulse width to a width that enables significant Stimulated Raman Scattering and self-frequency shift of a pulse within a device according to the invention. Dispersion decreasing fibers have continuously or stepwise decreasing dispersions along their length and provide a narrowed output pulse having a temporal width, $\Delta\tau$, (Z) determined according to:

$$\Delta\tau(Z) = \Delta\tau(o)e^{-pz} \quad \text{Equation 6}$$

where $\Delta T$ (o) is the pulse width at z=0, and p is the pulse rate of dispersion change if the dispersion rate of change is also exponential and adiabatic. For adiabatic pulse narrowing p must be less than zero.

A gate or switch of the present invention may further include an optical component which broadens the output pulse width of a pulse propagating through a gate or switch so that the pulse is at its original input pulse width (which may be a standard network pulse width) when it exits a gate or switch. In a logic gate, a pulse broadening component is best implemented before wavelength-selective filter 14, while in a switch embodiment of the invention, a pulse broadening optical component is best implemented before splitter 32.

Pulse broadening is preferably accomplished with use of a dispersion increasing fiber (DIF) 62. Dispersion increasing fibers have continuous or stewpwise increasing dispersions along their length and increase the temporal width, $\Delta T$ (Z), of a pulse propagating though the fiber according to:

$$\Delta\tau(Z) = \Delta\tau(o)e^{pz} \quad \text{Equation 7}$$

where $\Delta\tau(o)$ is the pulse width at z=0, and p is the pulse rate of dispersion change if the dispersion rate of change is also exponential and adiabatic. For adiabatic pulse broadening p must be greater than zero.

For a more detailed discussion of dispersion increasing and dispersion decreasing fibers, see "A Single-Mode Fiber with Chromatic Dispersion Varying Along the Length," V. Bogatyrev et al., Journal of Lightwave Technology, Vol. 9, No. 5., pp. 561–566, May 1991.

Pulse narrowing and broadening can also be accomplished with use of chirped, photorefractive, fiber Bragg gratings. Fiber gratings are more compact (lengths of about 1–10 nm) but are reflective at the central design wavelength and therefore require additional components to extract the compressed pulse. Dispersion-tailored fiber can adiabatically compress or expand the soliton while maintaining its transform limited pulse shape. Chirped fiber gratings can also stretch a pulse by launching the light in the opposite direction (in reverse).

Implementing a pulse broadening component in a coupler output fiber 22 of a gate or switch such that pulse broadening occurs after Raman scattering is stimulated can provide additional advantages. Namely, the detectability of a wavelength shift is increased. In general, when a pulse's temporal width is broadened, its spectral profile narrows. Thus, by broadening the width of coupler output pulse after Raman scattering is stimulated, the number of filter-detectable wavelengths that can be detected within a normal operating band (for example, the erbium amplifier gain band) can be increased. Therefore, spectral narrowing of a coupler output pulse is particularly useful in the case where a switch is provided having a plurality of output lines.

Material properties of a DDF or DIF in an output fiber of a gate or switch can be controlled so that a desired Raman threshold is obtained, and suitable wavelength shifts are generated under select input conditions. Nevertheless, it is preferred for purposes of design control that devices of the invention include a separate length of fiber, designated as central fiber 64 for controlling the Raman threshold and wavelength shifting. Central fiber 64 of output fiber 22 of a gate or switch is optically connected at the output of a pulse compressing device 60 such that propagating pulses are not of sufficient pulse width for significant Raman scattering to take effect until the pulses reach central fiber 64. Thereby, substantially all Raman scattering of output pulse 20 in output fiber 22 takes place in central fiber 64. Central fiber 64 can be a dispersion-decreasing fiber designed to maintain the soliton pulse width if central fiber 64 is long enough that loss significantly broadens the pulse.

While the present invention has been described with reference to a number of specific embodiments, it will be understood that the spirit and scope of the present invention should be determined with reference to the appended claims.

What is claimed is:

1. A method for generating a logical output that varies depending on the input pattern of a plurality of input pulses, each input pulse having a predetermined high state power level, said method comprising the steps of:

coupling said plurality of input pulses onto an output fiber to generate a coupler output pulse having a power level approximately equal to the sum power level of said input pulses, said plurality of input pulses having an original input pulse width, said output fiber having a Raman threshold;

stimulating Raman scattering of said coupler output pulse when the power level of said output pulse exceeds said Raman threshold, said stimulating step selectively shifting the wavelength of said output pulse; and blocking said output pulse using a wavelength-selective filter where said pulse has a wavelength corresponding to an input pattern desired to result in a "0" logical output.

2. The method of claim 1, wherein said each input pulse has a power level of at least 1/M times said Raman threshold where M is the number of inputs, and wherein said filtering step only passes pulses having wavelengths corresponding to the condition that each input is high so that said method provides an AND logical operation.

3. The method of claim 1, wherein said each input pulse has a power level of between about 1/M and about 1/(M−1) times said Raman threshold where M is the number of inputs, and wherein said filtering step blocks pulses having unshifted wavelengths so that said method provides an AND logical operation.

4. The method of claim 1, wherein said plurality of input pulses is two input pulses, each having a high state power level greater than said Raman threshold, and wherein said filtering step blocks unshifted pulses and pulses having wavelengths corresponding to the condition that both inputs are high, so that said method provides an EXOR logical operation.

5. The method of claim 1, wherein said plurality of input pulses is two input pulses, each having a high state power level of between about 0.5 and 1.0 times said Raman threshold, and wherein said filtering step blocks shifted pulses so that said method provides an EXOR logical operation.

6. The method of claim 1, wherein said coupling step includes the step of maintaining the power level of said coupler output at a level close to the fundamental soliton order number to limit spectral fluctuations of said coupler output.

7. The method of claim 1, wherein said coupling step includes the step of maintaining the power level of said coupler output at a soliton order number of between about N=0.5 and N=2 to limit spectral fluctuations of said coupler output.

8. The method of claim 1, further comprising the step of:

narrowing the temporal width of said coupler output pulse to a width on the order of 1 ps or less to allow efficient intrapulse Raman scattering of said coupler output pulse.

9. The method of claim 1, further comprising the step of:

narrowing the temporal width of said coupler output pulse using a dispersion decreasing fiber to a width on the order of 1 ps or less to allow efficient intrapulse Raman scattering of said coupler output pulse.

10. The method of claim 1, further including the step of:

broadening the temporal width of said output pulse so that said pulse is at a width approximately equal to said original input pulse width.

11. The method of claim 1, further including the step of:

broadening the temporal width of said output pulse using a dispersion increasing fiber so that said pulse is at a width approximately equal to said original input pulse width.

12. A method for switching an input pulse to a selected output line of a plurality of possible output lines, said method comprising the steps of:

coupling an input pulse with a control pulse onto an output fiber to generate a coupler output pulse having a power level approximately equal to the combined power level of said input pulse and said control pulse, said output fiber having a Raman threshold, said input pulse having a soliton order number and an original pulse width;

stimulating Raman scattering of said coupler output pulse if said coupler output pulse has a power level exceeding said Raman threshold, said stimulating step shifting the wavelength of said coupler output pulse by an amount determined by the power level of said coupler output pulse;

splitting said coupler output pulse into a plurality of switch output pulses; and filtering each of said plurality of switch output pulses using a wavelength-selective filter, said filtering step passing or not passing a switch output pulse depending on the pass band of said filter and on the wavelength of said switch pulse, as determined by said control pulse.

13. The method of claim 12, wherein said input pulse has a power level approximately equal to said Raman threshold.

14. The method of claim 12, wherein said coupling step includes the step of maintaining the power level of said coupler output at a level close to the fundamental soliton order number to limit spectral fluctuations of said coupler output pulse.

15. The method of claim 12, wherein said coupling step includes the step of maintaining the power level of said coupler output at a level of between about N=0.5 and N=2 to limit spectral fluctuations of said coupler output.

16. The method of claim 12, further comprising the step of:

narrowing the temporal width of said coupler output pulse to a width on the order of 1 ps or less to allow efficient Raman scattering of said coupler output pulse.

17. The method of claim 12, further comprising the step of:

narrowing the temporal width of said coupler output pulse using a dispersion decreasing fiber to a width on the order of 1 ps or less to allow efficient Raman scattering of said coupler output pulse.

18. The method of claim 12, further comprising the step of:

broadening the temporal width of said output pulse so that said pulse is at a width approximately equal to an original input pulse width.

19. The method of claim 12, further comprising the step of:

broadening the temporal width of said output pulse using a dispersion increasing fiber so that said pulse is at a width approximately equal to said original input pulse width.

20. An optical logic gate comprising:

a plurality of input lines each input line adapted to transmit an input pulse having a predetermined power level;

an output fiber having a Raman threshold;

coupling means for coupling said input lines, said coupling means adapted for coupling a plurality of said input pulses onto said output fiber, said coupling means generating a coupler output pulse having a power level approximately equal to the sum power level of said input pulses;

stimulating means adapted for selectively stimulating Raman scattering of said coupler output pulse when the power level of said output pulse exceeds said Raman threshold, said stimulating means selectively shifting the wavelength of said output pulse; and a wavelength selective filter adapted to block said output pulse where said pulse has a wavelength corresponding to an input pattern desired to result in a "0" logical output.

21. An optical switch, comprising:

an input line adapted to transmit an input pulse, said input pulse having a predetermined power level;

a control line adapted to transmit a control pulse;

an output fiber having a Raman threshold;

coupling means for coupling said input line and said control line, said coupling means adapted to couple said input pulse and said control pulse onto said output fiber, said coupling means generating a coupler output pulse having a power level approximately equal to the combined power level of said input pulse and said control pulse;

stimulating means for selectively stimulating Raman scattering of said coupler output pulse if said coupler output pulse has a power level exceeding said Raman threshold, said stimulating step shifting the wavelength of said coupler output pulse by an amount determined by the power level of said coupler output pulse;

splitting means connected to said output fiber for splitting said coupler output pulse into a plurality of switch output pulses;

a plurality of output lines, each output line adapted to receive one of said splitter output pulses;

a plurality of wavelength-selective filters, each filter connected at one of said output lines, said each filter adapted to pass or not pass a switch output pulse depending on the pass band of said filter and on the wavelength of said switch pulse, as determined by said control pulse.

* * * * *